United States Patent
Davis

(10) Patent No.: US 9,523,624 B2
(45) Date of Patent: Dec. 20, 2016

(54) METHOD AND MAINTENANCE SYSTEM FOR TESTING AND CLEARING FREEZELESS WATER HYDRANTS

(71) Applicant: Chantry Davis, Keyes, OK (US)

(72) Inventor: Chantry Davis, Keyes, OK (US)

( * ) Notice: Subject to any disclaimer, the term of this patent is extended or adjusted under 35 U.S.C. 154(b) by 119 days.

(21) Appl. No.: 14/680,112

(22) Filed: Apr. 7, 2015

(65) Prior Publication Data

US 2016/0298318 A1 Oct. 13, 2016

(51) Int. Cl.
*G01M 3/28* (2006.01)
*G01M 3/38* (2006.01)
*E03B 9/18* (2006.01)
*E03B 9/14* (2006.01)

(52) U.S. Cl.
CPC .................. *G01M 3/38* (2013.01); *E03B 9/14* (2013.01); *E03B 9/18* (2013.01)

(58) Field of Classification Search
CPC .... G01M 3/28; G01M 3/2807; G01M 3/2815; E03B 9/14; E03B 9/18
USPC ...................................... 137/559; 73/37–49.8
See application file for complete search history.

(56) References Cited

U.S. PATENT DOCUMENTS

| | | | | |
|---|---|---|---|---|
| 2,727,383 A * | 12/1955 | Ross | ..................... | B08B 9/0321 29/407.01 |
| 3,534,762 A * | 10/1970 | Noland | ..................... | E03B 9/14 137/209 |
| 3,566,905 A * | 3/1971 | Noland | ..................... | E03B 9/14 137/209 |
| 3,756,072 A * | 9/1973 | MacMurray | ........ | G01M 3/3209 73/40.5 R |
| 4,246,926 A * | 1/1981 | Morello | .................. | F16K 51/00 137/209 |
| 5,440,918 A * | 8/1995 | Oster | .................. | G01M 3/2892 73/40.5 R |
| 5,548,993 A * | 8/1996 | Alexander | .......... | G01M 3/2815 73/40.5 R |
| 5,850,037 A * | 12/1998 | Mullins | ............... | G01M 3/2815 73/40.5 R |
| 5,857,480 A * | 1/1999 | Klein | .................... | B08B 9/0321 137/209 |
| 6,167,749 B1 * | 1/2001 | Yanagisawa | ........ | G01M 3/2815 73/40 |
| 6,826,957 B2 * | 12/2004 | Martone | ............. | G01M 3/3236 73/40.5 R |
| 2008/0216560 A1 * | 9/2008 | Ridgway | ............. | G01M 3/3263 73/40.5 R |

* cited by examiner

*Primary Examiner* — Peter Macchiarolo
*Assistant Examiner* — Nathaniel Kolb
(74) *Attorney, Agent, or Firm* — Edward L. White

(57) ABSTRACT

A freezeless hydrant maintenance system for testing, troubleshooting, and repairing the functionality of a freezeless water hydrant prior to the seasonal freezing temperatures, the system comprising a pressure vessel adapted to receive and hold a fluid under pressure, an actuator adapted to release the pressurized fluid upon the user's command, at least one display and an adapter hose adapted to engage a hydrant and seal to prevent pressure loss, whereby the system is attached to a freezeless hydrant, the user opens hydrant pressurizing the vertical pipe and hydrant with water and air, observes the display determining if the freezeless hydrant drain hole is block, then operates the system applying additional pressure to clear blockage, and identifies a hydrant that needs replacement.

13 Claims, 2 Drawing Sheets

METHOD AND MAINTENANCE SYSTEM FOR TESTING AND CLEARING FREEZELESS WATER HYDRANTS

CROSS-REFERENCE TO RELATED APPLICATIONS

None.

FIELD OF THE INVENTION

The present invention generally relates to testing, troubleshooting, and clearing freezeless hydrants in order to prevent rupturing of the riser pipe when temperatures fall below freezing. In particular, the invention relates to a method and a maintenance system that may comprise of a pressure vessel, actuator, pressure gauge, and connecting hose, for testing and troubleshooting the functionality of the drain mechanism in a freezeless water hydrant, and allowing an operator to clear obstructions in the drain mechanism without unearthing the entire hydrant.

SUMMARY OF THE INVENTION

The invention relates to a method for an operator to test and troubleshooting freezeless water hydrants and clear obstructions in the drain mechanism without unearthing the valve. More particularly, the invention relates to a method for detecting obstructions in the drain mechanism of the hydrant by connecting an adapter hose, with an attached pressure gauge, to the hydrant and pressurizing the hydrant and riser pipe in order to determine whether the drain mechanism may be functioning properly, and in the event that it may not, a compressed fluid from the maintenance system may be released to clear any obstruction from the drain hole and restore faucet functionality.

Water hydrants typically have a valve above ground that allows the flow of water from the water supply underground up through the riser and out through the hydrant body at the end of the riser. During the winter months, if water remains in the riser and hydrant when temperatures remain below freezing for a significant period of time, then water inside the riser and hydrant may freeze causing the riser and/or hydrant to burst.

To overcome this problem, a freezeless hydrant was invented, which places the valve lower on the riser such that it may be placed underground below the frost line to prevent the freezing problem described above. Additionally, freezeless water hydrants are designed to prevent water from freezing inside the hydrant's riser pipe, by allowing the water to drain by gravity downwardly through a drain mechanism positioned below the frost line. The drain mechanism is comprised of a plunger, drain hole, and rod, connecting the plunger to the handle of the hydrant. The handle of the hydrant actuates a plunger, which, when in the open position, closes the drain hole thereby allowing water to come up through the riser pipe and out through the hydrant, and, while in the closed position, allows excess water to flow downwardly and exit through the drain hole. The system prevents the accumulation of water in the riser pipe and hydrant above the frost line, thus preventing the pipe from bursting in freezing temperatures.

Clogging problems often arise with this type of drain system, because the drain hole is prone to being obstructed by various materials such as tree roots, gravel, sand, and clay. In order to inspect and maintain the drain mechanism of a freezeless hydrants, at a minimum an operator must excavate the area around the valve to inspect or they must remove the hydrant valve from under the ground and perform a manual inspection, which are both time consuming, costly, and likely to induce further problems and in many instances, unnecessary. U.S. Pat. No. 4,653,521 to Fillman, teaches a freezeless hydrant invention with a drain mechanism comprising an underground storage cylinder, which is filled with residual water when the faucet is turned off. When the faucet is turned on, a mechanical linkage between the residual water storage cylinder and the faucet handle causes the cylinder to expel excess drain water upwardly above the ground. Fillman device teaches a complex freezeless hydrant designed to prevent contamination of the water flowing through the hydrant by allowing the water to drain from the riser pipe and capturing it in underground drain storage cylinder.

U.S. Pat. Nos. 3,534,762 and U.S. Pat. No. 3,566,905 to Noland, both disclose a mechanism for purging excess water from the base of a non-freezeless hydrant in a city where underground drainage is prohibited, in order to prevent the accumulation and freezing of water in the riser pipe during periods of subfreezing temperatures. The device incorporates a compressed air system in communication with a discharge pipe for discharging excess riser pipe water upwardly and above ground. Noland's device does not disclose a testing or troubleshooting method for determining whether the drain mechanism is functioning properly.

U.S. Pat. No. 4,245,926 to Morello, discloses a compressed air purging system, comprising a valve adapter that is detachably mounted to a water pipe, which is capable of controlling a supply of compressed air in order to expel any residual water from the pipe. Morello does not disclose a drain hole nor the expelling of water through such a hole.

U.S. Pat. No. 5,857,480 to Klein, discloses a system for using the flow of water to compress air in order to purge the water pipe of residual water. The compressed air is stored in a tank, and is used to expel excess water from the riser pipe. Klein's system teaches a device and method for purging water from a water hose and a sprinkler system but does not disclose a means for testing whether the drain mechanism is functioning properly.

The prior art addresses the use of compressed air to remove water from the pipes, hoses, hydrants, and sprinkler systems whereas the present invention addresses the testing, detection and removal of obstructions from the drain mechanism thereby eliminating the need for a manual inspection by incorporating both an obstruction testing mechanism and a system for clearing obstructions from the drain hole. The present invention, then, fulfills a need not addressed by any of the prior art discovered, in that it allows for quick testing of a drain mechanism, and clearing obstructions that may prevent the hydrant from functioning properly.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting, except to the extent otherwise required by law. As such, those skilled in the art will appreciate that the conception, upon which this disclosure is based, enables and may readily be utilized as a basis for the designing of other structures, methods, and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such all constructions embodied within the spirit and scope of the present invention.

Further, the purpose of the foregoing abstract is to enable the U.S. Patent and Trademark Office and the public generally, and especially the scientist, engineers and practitioners in the art, who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
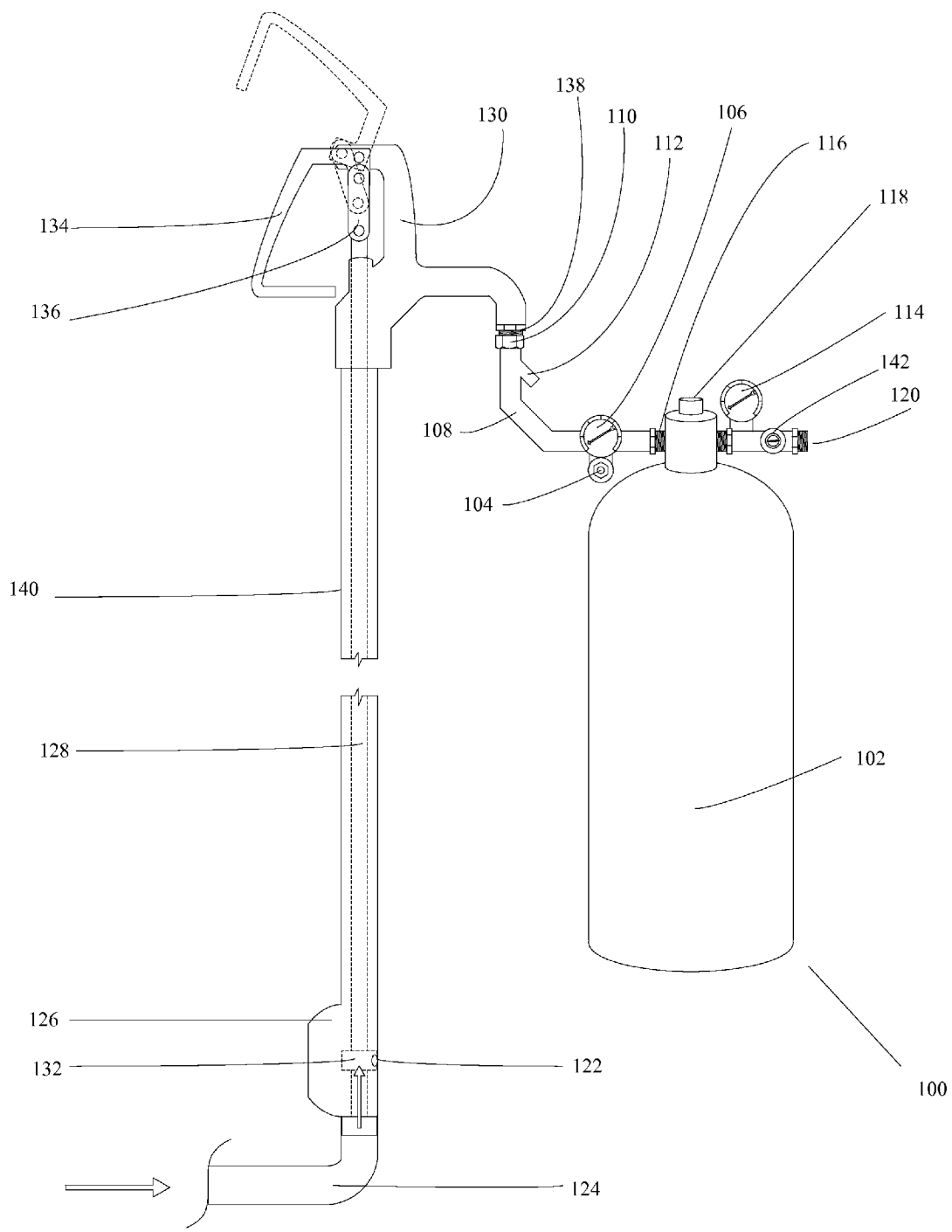
FIG. 1 is a detailed diagrammatic view of the testing and clearing system connected to a freezeless hydrant.

FIG. 1 shows an embodiment of the invention, a maintenance system connected to a freezeless hydrant, the maintenance system 100 highlighting four components: a pressure vessel 102, an actuator 118, a test pressure gauge 106, and an adapter hose 108 with a female threaded adapter 110. The type of pressure vessel 102 may be selected from a group consisting of, but not limited to metal, composite, fiberglass, polymers, and concrete. One embodiment allows for the filling and pressurization of the fluid inside the pressure vessel 102 at a production plant creating a disposable system but another embodiment has attached to the pressure vessel 102 a vessel filling adapter 120 and a valve 142, which allows the tank to be filled with a pressurized fluid including but not limited to air, water, a water solution, and an chemical solution. The vessel filling adapter 120 may be connected to an outside pressure source wherein the valve 142 is opened and pressurized fluid flowing into the pressure vessel 102 pressurizes the vessel until a desired level may be obtained and the valve 142 is closed. This level of pressurization may be indicated by the vessel pressure gauge 114 that is in communication with the pressure vessel 102 when the tank is not being recharged. The operator filling the pressure vessel 102 should not exceed the rated limits. As the maintenance system is used, the level of pressurization may decrease accordingly. The operator may need to refill the pressure vessel 102 once the pressurization level falls below the regulated output in order for the clearing process to be effective.

The actuator 118 may be is attached to the pressure vessel 102 wherein an operator may activate the actuator thereby releasing fluid from the pressure vessel 102 and sending it through the test pressure gauge 106, which displays the test pressure, output pressure regulator 104 which controls the pressure that may be exerted on the freezeless hydrant, and the adapter hose 108 connected to the hydrant body 130. The actuator 118 may be selected from a group consisting of, but not limited to: mechanical, electromechanical, electrohydraulic, or electro-pneumatic. Connecting the actuator 118 and pressure vessel 102 to the test pressure gauge 106 may be a pressure vessel connector 116.

The pressure measuring, regulating, and displaying system comprises a pressure vessel gauge 114, test pressure gauge 106, and an output pressure regulator 104 for adjusting the outwardly flow of pressurized fluid. The input side may contain a vessel filling adapter 120 and vessel pressure gauge 114 that was described above. The output side may contain an output pressure regulator 104, a safety valve 112 and a test pressure gauge 106 that may be connected to the freezeless hydrant threaded male spout 138 via an adapter hose 108, which may contain a safety valve 112. The pressure gauges display the vessel pressure and the test pressure. The pressure gauges may be selected from a group consisting of, but not limited to analog and digital. The pressure regulator limits the output pressure going to the hydrant 130 to a desired level set by the operator. This limit may be decreased or increased by the operator based on the condition of the hydrant or piping and obstruction but should not be set such that the pressure could cause the hydrant or piping to fail and possibly injure the operator or surrounding personnel. Additionally, a safety valve 112 may be part of the adapter hose 108 to relieve the pressure should the pressure rise above the pipe's or hydrant's rated pressure wherein the safety valve should open and prevent this type of over pressure occurrence. The pressure regulator may be selected from a group consisting of, but not limited to mechanical, electrical, electromechanical, electrohydraulic, or electro-pneumatic.

The freezeless hydrant has four main components: a hydrant body 130, a pipe riser 140, a hydrant valve 126, and a pressurized water supply 124 connection. The hydrant body 130 may be connected to the pressurized water supply 124 via the pipe riser 140 and contains a hinge 136 and handle 134 for opening and closing the hydrant valve 126 and allowing the flow of water from the supply 124 out through the hydrant threaded male spout 138 under normal operations. Lifting the handle opens the hydrant valve 126 by raising the valve rod 128 and plunger 132 thereby allowing water to flow from the pressurized water supply 124 up through the riser pipe 140 and out through the spout 138. Additionally, when the plunger 132 is raised, the drain hole 122 becomes obstructed preventing the water flowing from the pressurized water supply 124 to exit via the drain hole 122. While the handle 134 is open, the riser pipe 140 and hydrant body 130 fill with water and remain filled until the handle is moved to the closed position. Lowering the handle pushes the valve rod 128 and plunger 132 assembly down, and uncovers the drain hole 122 allowing excess water to drain below the frost line. The key feature to the freezeless hydrant is the ability of the water to drain from the hydrant body 130 and riser pipe 140 down and out through the drain hole 122, which is located below the frost line. When the drain hole 122 is obstructed, this prevents the water from draining and subjects the riser pipe 140 and hydrant body 130 to freezing and bursting. Connecting the maintenance system 100 to the freezeless hydrant allows one skilled in the art to test, detect, clear obstructions, and determine if replacement is necessary.

Figure 2:
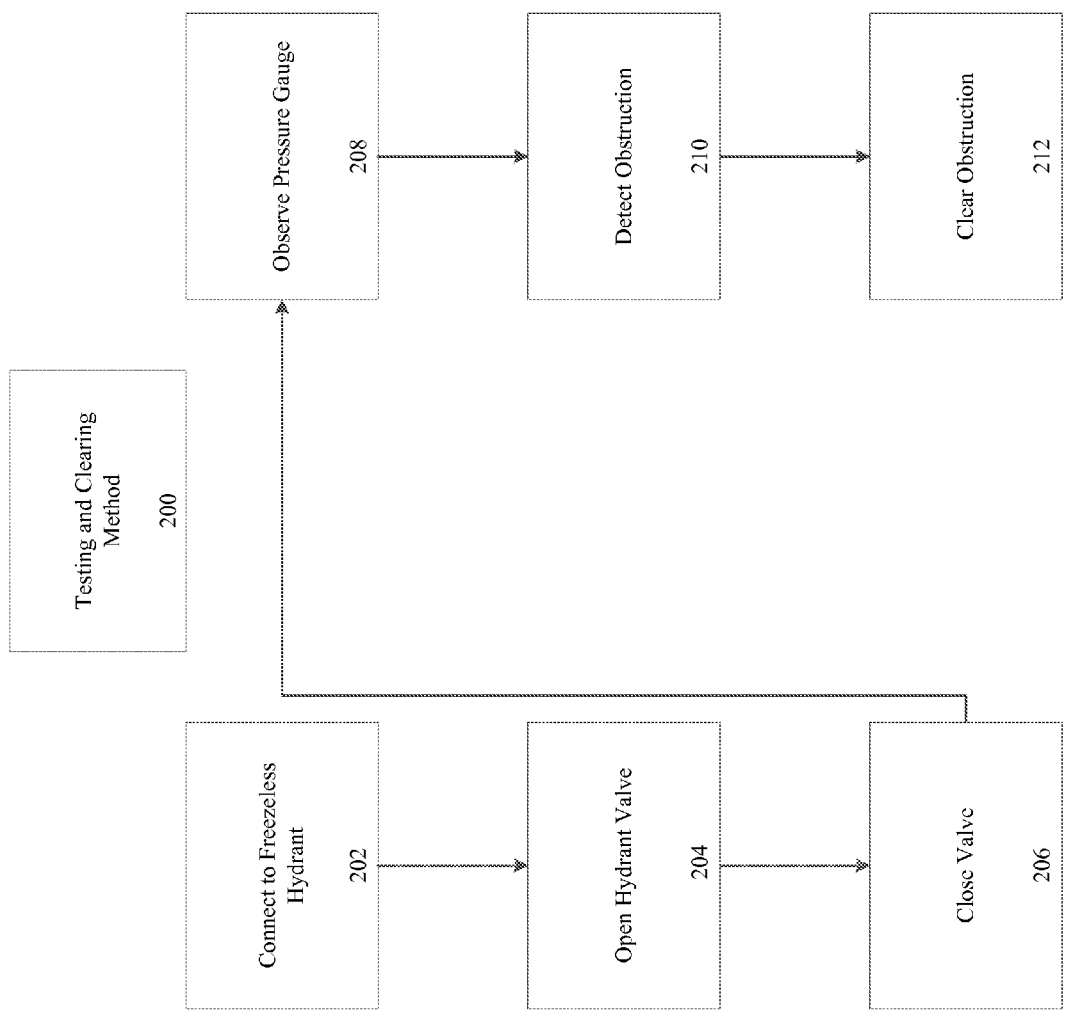
FIG. 2 is a flow diagram illustrating a process for detecting and clearing obstructions from the drain mechanism of a freezeless hydrant.

FIG. 2 illustrates the testing and clearing method 200 for the preferred embodiment of this invention, which may include the following steps: connect to the freezeless hydrant 202, open the hydrant valve 204, close the hydrant valve 206, observe pressure gauge 208, detect obstruction 210, and clear obstruction 212. A step in the preferred testing and clearing method 200 is connecting the maintenance system 100 to a freezeless hydrant. This may be accomplished by engaging the female threaded adapter 110 located at the end of the adapter hose 108 to the hydrant male threaded spout 138. Once the engagement is complete, the connection should be airtight to enable an accurate reading. In addition to the female threaded adapter 110, one skilled in the art may utilize a quick disconnect for engaging the hydrant threaded male spout 138 but is not limited to these two type of engagement methods for engaging a threaded spout.

A next step in the preferred embodiment may be to place the handle 134 in open position by lifting it upward wherein the hydrant valve is opened. Opening the valve allows water to start flowing to fill the air space thus pressurizing the riser pipe 140 and hydrant body 130. This pressure may be registered on the test pressure gauge 106. A next step may include closing the valve 206 by lowering the handle, which lowers the valve rod 128 and engages the plunger 132 thereby stopping the flow of water from the pressurized water supply 124 and uncovering the drain hole 122 thus allowing water to escape.

A next step in the preferred method 200 may include the observation of the pressure gauge 208 to check if the hydrant's drain mechanism is functioning properly. If the drain mechanism is operating correctly and the drain hole 122 is unobstructed, the observed pressure reading should fall to zero, from an initial pressure of typically between 50 and 60 psi. However, if the pressure stays constant or slowly returns to zero, then an obstruction may have been detected 210. The obstruction indicator could be visual as in the present embodiment, auditory, but is not limited to these types of indicators. It would be apparent to one skilled in the art the type of indicator to be used based on the environmental conditions or other conditions that may be relevant.

Once an obstruction is detected 210, the operator may continue to a next step, clear obstruction 212 in the preferred embodiment. To accomplish the clear obstruction step 212, an operator may use the maintenance system 100 in an attempt to clear the obstruction 212 by adding sufficient pressurization to the riser pipe 140 and hydrant body 130 to blow out the blockage. To accomplish the clearing obstruction 212 step requires one skilled in the art setting the pressure that is to be released from the pressure vessel 102, which may be done by using the test pressure gauge 106 in concert with the output pressure regulator 104. The amount of pressure may be adjustable, and can be tailored to suit specific environments. Next, the actuator 118 may be manually engaged in order to release a pressurized fluid into the hydrant body 130 and down through the riser pipe 124. Alternatively, an automated actuator mechanism could be implemented which would automatically attempt to clear an obstruction once an obstruction was detected.

The pressurized fluid then encounters the drain hole 122 and outwardly pushes any obstruction present, clearing the drain hole 122. The pressurized fluid may consist of a pressurized fluid including, but is not limited to air, water, a water solution, and a chemical solution. If the system is incapable of clearing the obstruction, then the hydrant may be removed, inspected, and cleared of any obstruction present in the drain hole 122 or replaced.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. A method for operating a freezeless hydrant maintenance system comprising the steps of:
   a. Providing the maintenance system having—
      i. a pressure vessel adapted to receive and hold a fluid under pressure,
      ii. an actuator adapted to release the pressurized fluid upon actuation,
      iii. at least one display, and
      iv. an adapter hose adapted to engage a hydrant and seal to prevent pressure loss;
   b. connecting a maintenance system to a freezeless hydrant;
   c. activating a freezeless hydrant thereby filling and pressurizing a vertical pipe and hydrant with air and water;
   d. deactivating the hydrant stopping the water flow;
   e. observing the pressure on the system display to determine if a hydrant drain is functioning properly;
   f. detecting an obstruction in the drain hole if the pressure does not return to its previous level; and
   g. clearing the obstruction by actuating the actuator to over-pressurize the hydrant with a fluid to remove the obstruction;

whereby the freezeless hydrant maintenance system is designed for a person to test and troubleshoot a freezeless hydrant enabling them to determine if the hydrant is functioning properly, can be repaired, or requires replacement prior to the hydrant and vertical pipe being subject to freezing temperatures thus preventing a rupture.

2. The method of claim 1 wherein, the pressure vessel is selected from a group consisting of metal, composite, polymers, and concrete.

3. The method of claim 1, wherein the pressure vessel includes at least one valve adapted to pressurize and depressurize the tank.

4. The method of claim 1, wherein the pressure vessel is pressurized from a pressurizing source selected from external, attached, and integrated pump.

5. The method of claim 1, wherein the pressure vessel automatically releases pressure upon exceeding a selected upper pressure limit.

6. The method of claim 1, wherein the maintenance system further comprises at least one pressure regulator adapted to adjust the pressure of the released fluid.

7. The method of claim 1, wherein the actuator is selected from group consisting of mechanical, electromechanical, electrohydraulic and electro-pneumatic.

8. The method of claim 1, including at least one sensor in communication with the display adapted to measure the pressure in the vertical pipe and hydrant.

9. The method of claim 8 wherein the hydrant's measured pressure is displayed to an operator.

10. The method of claim 1, including at least one sensor in communication with the display adapted to measure the pressure in the pressure vessel.

11. The method of claim 10 wherein the pressure vessel's measured pressure is displayed to an operator.

12. The method of claim 1, wherein step g is repeated at incrementally higher pressures to remove the obstruction.

13. The method of claim 12 wherein the pressure increase does not exceed the lower of the pressure ratings of the hydrant and the vertical pipe.

* * * * *